(12) United States Patent
Oechsle et al.

(10) Patent No.: US 10,270,078 B2
(45) Date of Patent: Apr. 23, 2019

(54) CELL CONNECTOR AND BATTERY CELL, BATTERY MODULE, BATTERY, BATTERY SYSTEM, VEHICLE AND METHOD FOR PRODUCING A BATTERY MODULE

(71) Applicant: Robert Bosch GmbH, Stuttgart (DE)

(72) Inventors: Matthias Oechsle, Ditzingen-Hirschlanden (DE); Seref Aktuerk, Karben (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 14/744,098

(22) Filed: Jun. 19, 2015

(65) Prior Publication Data

US 2015/0380711 A1 Dec. 31, 2015

(30) Foreign Application Priority Data

Jun. 26, 2014 (DE) .................. 10 2014 212 264

(51) Int. Cl.
*H01M 2/20* (2006.01)

(52) U.S. Cl.
CPC ........ *H01M 2/206* (2013.01); *H01M 2220/10* (2013.01); *H01M 2220/20* (2013.01)

(58) Field of Classification Search
CPC ...... H01M 2/206; H01M 2/202; H01M 2/204; H01M 2/208; H01M 2220/20; H01M 2220/10; H01R 11/281; H01R 11/126; H01R 11/282
See application file for complete search history.

(56) References Cited

U.S. PATENT DOCUMENTS

| 8,033,875 B1 * | 10/2011 | Maguire | H01M 2/206 439/762 |
| 2011/0151728 A1 * | 6/2011 | Astola | A61B 5/0416 439/733.1 |
| 2012/0288744 A1 * | 11/2012 | Guen | H01M 2/206 429/158 |
| 2014/0356691 A1 * | 12/2014 | Ahn | H01M 2/305 429/158 |

FOREIGN PATENT DOCUMENTS

DE 102011088576 6/2013
JP 1186831 3/1999

OTHER PUBLICATIONS

Machine translation of JP 11-086831 (Mar. 1999).*

* cited by examiner

*Primary Examiner* — Eugenia Wang
(74) *Attorney, Agent, or Firm* — Michael Best & Friedrich LLP

(57) ABSTRACT

A cell connector for an electrical or mechanical connection of cell terminals of battery cells is described. The cell connector is characterized by a clip element for fastening the cell connector to the cell terminals comprising a back section, a first limb section which is formed at a first end of the back section, having a first engagement section, and a second limb section, which is formed at a second end of the back section and is formed so as to be spaced apart from and opposite the first limb section, having a second engagement section, wherein the clip element is designed in such a way that it can at least partially surround the cell terminals.

20 Claims, 11 Drawing Sheets

CELL CONNECTOR AND BATTERY CELL, BATTERY MODULE, BATTERY, BATTERY SYSTEM, VEHICLE AND METHOD FOR PRODUCING A BATTERY MODULE

BACKGROUND OF THE INVENTION

It is conceivable that increasingly new battery systems (rechargeable battery systems) for example with lithium-ion rechargeable batteries, lithium-polymer rechargeable batteries or nickel-metal hybrid rechargeable batteries, are used increasingly both in stationary applications, for example in wind turbines, and in mobile applications, for example in electric motor vehicles (electric vehicles, EVs) or hybrid vehicles (hybrid electric vehicles, HEV), as rechargeable electrical energy stores (EES).

The battery systems need to meet very stringent requirements as regards the usable energy content, the charging/discharging efficiency, the reliability, the life and the undesirable loss of capacity owing to frequent partial discharge.

A battery system comprises a large number of battery cells. Owing to their cell internal resistance and the electrochemical processes occurring, the battery cells heat up during charging and discharging. The battery cells can be interconnected in series in order to increase the electric voltage and/or interconnected in parallel in order to increase the maximum electric current. In this case, the battery cells can be combined to form battery modules or battery units. When used for driving vehicles, for example, approximately 100 battery cells (as a traction battery) can be interconnected in series or in parallel. In a high-voltage battery system, the total voltage can therefore be 450 V or even 600 V, for example.

In order to ensure the operation and life of the battery module or battery system, it is therefore necessary to connect the electrical connections (cell terminals) of the battery cells to one another in a reliable manner. In order to connect the cell terminals, cell connectors are used, wherein the cell connectors comprise an electrically conductive material, for example a metal such as aluminum (Al) or copper (Cu) and/or are connected to the cell terminals by means of bonding, welding or screwing, for example. The cell connectors can be in the form of elastically and/or plastically deformable cell connectors in order to protect the cell terminals from excessively high forces and/or bending torques. Thus, the cell connectors can also compensate for manufacturing tolerances and/or operation-related relative movements of the battery cells.

JP H11-86831 already discloses a two-part cell connector which is designed to be displaceable along a multiplicity of cell terminals.

In order to further increase the functionality and reliability of batteries (rechargeable batteries) and battery systems (rechargeable battery systems), however, it is necessary to provide an improved cell connector.

SUMMARY OF THE INVENTION

The apparatuses and methods according to the invention have the advantage that a very simple, reliable and nevertheless detachable connection of the cell terminals can be provided. Thus, electrical contact-making of the cell terminals for the transmission of electrical energy can be ensured over the life of the battery. In this case, the contact-making is performed using a suitable contact normal force. Furthermore, manufacturing tolerances in the battery cells and their cell terminals and/or relative movements between the battery cells during operation can be compensated for. Thus, forces and/or torques such as bending torques which are transmitted from a cell connector to the cell terminals can be reduced. In addition, the design of the cell connector can be simplified. In this case, means for the plastic deformability of the cell connector and/or compensation elements such as spring elements or compensation bows can be dispensed with. As a result, the number of necessary components can be reduced. Furthermore, the cell connector can be fitted easily and/or, for example when being reused, can be disassembled without using any complex tools or assemblies.

Expediently, the clip element can be designed to be sprung at least sectionally, for example in a back section. Thus, contact-making by means of spring force can be ensured. As a result, the contact-making can be maintained automatically and/or permanently. The clip element can comprise steel such as spring steel, for example.

Expediently, the clip element can be designed to be electrically conductive. As a result, the design of the cell connector can be simplified further.

Alternatively, the clip element can be designed to be electrically nonconductive. As a result, electrical insulation of the cell connector can be provided. Thus, for example, cell terminals can be connected to one another only mechanically in order to increase stability.

Expediently, the first limb section with the first engagement section and the second end section with the second engagement section can be designed to be symmetrical with respect to one another. As a result, a particularly simple connection can be provided.

Alternatively, the first limb section with the first engagement section and the second limb section with the second engagement section can be designed to be asymmetrical with respect to one another. As a result, a particularly secure connection can be provided.

Expediently, the clip element, for example the back section, the first limb section or the second limb section can be designed in such a way that the first engagement section, the second engagement section or the first engagement section and the second engagement section can each engage in the cell terminals. As a result, the connection can be matched to the respective requirements.

Expediently, the clip element can be designed in such a way that the back section, the first limb section or the second limb section can be divided into a multiplicity of regions for example in the form of fingers, in comb-like fashion or in tongue-like fashion, wherein the clip element can at least partially surround the cell terminals in each case in the regions. As a result, a particularly light clip element can be provided. In addition, the machining and/or fitting of the clip element can be simplified.

Expediently, the clip element can be designed to be severable, for example cuttable, with the result that the clip element can be cut to length depending on a number of or a spacing between the cell terminals. As a result, the clip element can be matched particularly easily to the respective requirements. Thus, the number of variants of the clip element can be reduced and the storage can be simplified.

Expediently, the cell connector can furthermore comprise an electrical conductor, for example a busbar, for electrically connecting cell terminals. As a result, the electrical connection can be improved, i.e. the electrical resistance of the cell connector can be reduced. Alternatively, the electrical connection can be made possible, for example, when the clip element is designed to be electrically nonconductive.

Expediently, the clip element, for example the back section, the first limb section or the second limb section can be designed in such a way that the electrical conductor or the busbar can be arranged between the clip element and the cell terminals. As a result, the design of the cell connector and its fitting can be further simplified.

Expediently, the electrical conductor or the busbar can comprise openings for passing through the first limb section or the second limb section. As a result, the electrical conductor or the busbar can be formed at least partially outside the clip element. As a result, its cross section can be enlarged and its electrical resistance can be reduced. Furthermore, devices, for example measuring devices such as current-measuring devices and/or temperature-measuring devices, can be connected to the electrical conductor or the busbar.

Expediently, the cell connector can furthermore comprise a securing element, which is connectable to the clip element in a region of the first limb section or second limb section, for securing the fastening of the cell connector. As a result, automatic and/or unintentional detachment of the connection can be prevented.

The invention furthermore provides a battery module, which comprises the previously described cell connector.

The invention furthermore provides a battery, which comprises the previously described cell connector or the previously described battery module.

The invention furthermore provides a battery system, which comprises the previously described cell connector, the previously described battery module or the previously described battery.

The invention furthermore provides a vehicle, in particular a motor vehicle such as an electric motor vehicle, hybrid vehicle or electric motorbike (electric bike, E-bike), electric bicycle (pedal electric cycle, pedelec), a seagoing vessel such as an electric boat or submarine, an aircraft or a spacecraft, which comprises the previously described cell connector, which is connected to the vehicle, the previously described battery module, which is connected to the vehicle, the previously described battery, which is connected to the vehicle, or the previously described battery system, which is connected to the vehicle.

Expediently, the clamping can comprise suspending the first engagement section in the first receiving section and then suspending the second engagement section in the second receiving section. As a result, the connection can be improved.

Expediently, the clamping can furthermore comprise pressing down the second limb section once the first engagement section has been suspended. As a result, in particular when the clip element is designed in a sprung manner, the connection can be further improved.

Expediently, the suspension of the second engagement section can comprise displacement of the clip element whilst maintaining the engagement of the first engagement section in the first receiving section. As a result, the connection can be further improved.

Expediently, the method can furthermore comprise providing a securing element and connecting the securing element to the clip element once the second engagement section has been suspended. As a result, automatic and/or unintentional detachment of the connection can be prevented.

Expediently, the method can furthermore comprise providing an electrical conductor or a busbar and arranging the electrical conductor or the busbar on the cell terminals. As a result, the fitting of the cell connector can be further simplified.

Thus, the weight and/or costs, for example manufacturing costs such as material costs and processing costs such as fitting costs, can be reduced. Furthermore, the reusability and the environmental friendliness can be increased.

BRIEF DESCRIPTION OF THE DRAWINGS

Further features and advantages of the present invention will become clear to a person skilled in the art from the description below relating to exemplary embodiments, which should not be interpreted as being restrictive to the invention, however, with reference to the attached drawings.

DETAILED DESCRIPTION

Figure 1:
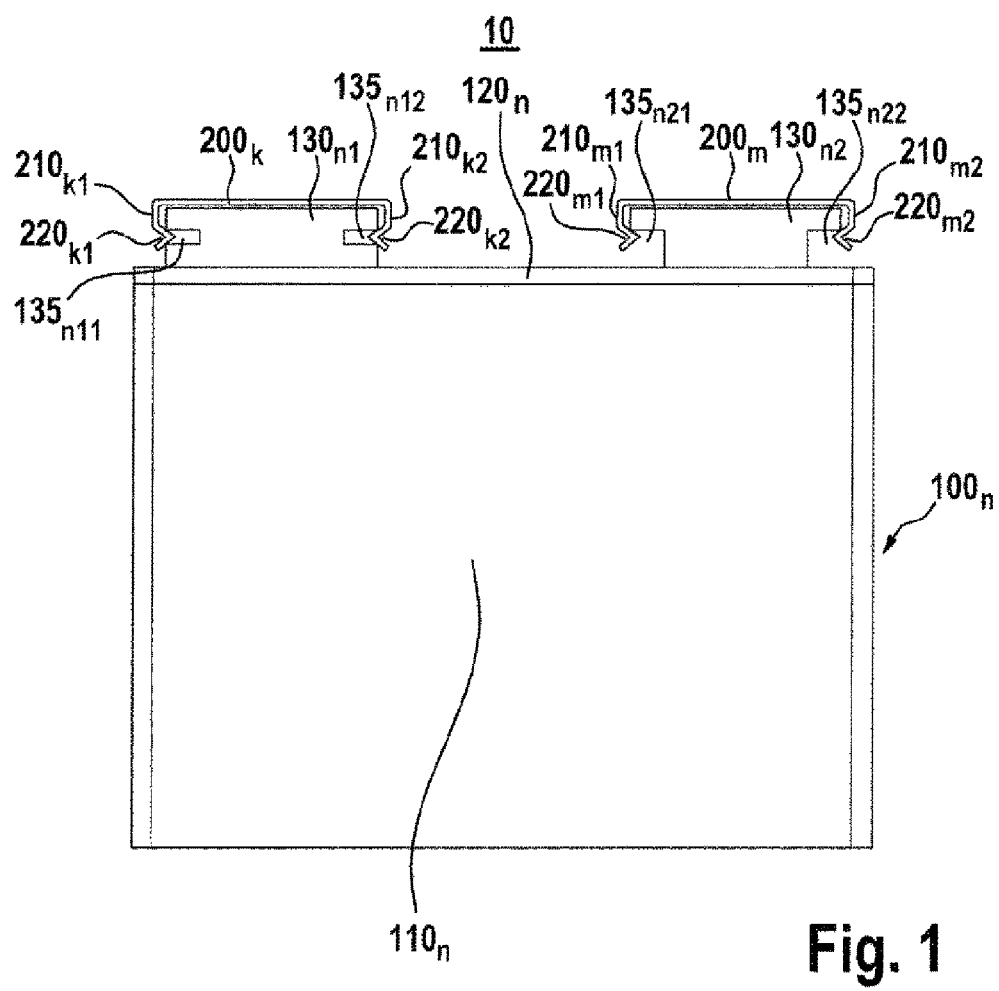
FIG. 1 shows a schematic side view of a battery module 10 comprising clip elements $200_k$, $200_m$ in accordance with one embodiment of the invention.

FIG. 1 shows a schematic side view of a battery module 10 comprising clip elements $200_k$, $200_m$ in accordance with one embodiment of the invention.

As shown by way of example in FIG. 1, the battery module 10 comprises a battery cell $100_n$ having a first cell terminal $130_{n1}$ and a second cell terminal $130_{n2}$ and a first clip element $200_k$, and a second clip element $200_m$, which are each arranged on the cell terminals $130_{n1}$, $130_{n2}$. The cell terminals $130_{n1}$, $130_{n2}$ act as electrical connections, i.e. positive terminal and negative terminal, are each rectangular and each comprise two receiving sections $135_{n11}$, $135_{n21}$, $135_{n12}$, $135_{b22}$, arranged opposite one another. As shown by way of example in FIG. 1, the first cell terminal $130_{n1}$ is formed prismatically with two slots (H-shaped) and the second cell terminal $130_{n2}$ is T-shaped.

The clip elements $200_k$, $200_m$ for fastening the cell connector each comprise a back section, a first limb section $210_{k1}$, $210_{m1}$, which is formed at a first end of the back section, having a first engagement section $220_{k1}$, $220_{m1}$ and a second limb section $210_{k2}$, $210_{m2}$, which is formed at a second end of the back section and so as to be spaced apart from and opposite the first limb section $210_{k1}$, $210_{m1}$, having a second engagement section $220_{k2}$, $220_{m2}$. The back section is flat.

The clip elements $200_k$, $200_m$ shown by way of example in FIG. 1 are symmetrical. They are U-shaped. Alternatively, they can be V-shaped, for example. The clip elements $200_k$, $200_m$ can be designed differently, if appropriate. The first engagement section $220_{k1}$, $220_{m1}$ and the second engagement section $220_{k2}$, $220_{m2}$ are designed in such a way that the cell terminals $130_{n1}$, $130_{n2}$ are each clamped between the first engagement section $220_{k1}$, $220_{m1}$ and the second engagement section $220_{k2}$, $220_{m2}$. The clip elements $200_k$, $200_m$ are designed to be sprung at least sectionally and surround the cell terminals $130_{n1}$, $130_{n2}$. The clip elements $200_k$, $200_m$ shown in FIG. 1 comprise spring steel and are electrically conductive. For this purpose. the spring steel can be coated, for example. Alternatively, the clip elements $200_k$, $200_m$ can comprise a plastic or composite material such as a carbon-fiber composite material.

For fitting, the clip elements $200_k$, $200_m$ are positioned on the cell terminals and then pressed down. Owing to the spring effect of the clip elements $200_k$, $200_m$, the limb sections $210_{k1}$, $210_{m1}$, $210_{k2}$, $210_{m2}$ can open and the engagement sections $220_{k1}$, $220_{m1}$, $220_{k2}$, $220_{m2}$ can reach and latch in the receiving sections $135_{n11}$, $135_{n21}$, $135_{n12}$, $135_{n22}$ of the cell terminals $130_{n1}$, $130_{n2}$.

The dismantling is performed in reverse order. To make this easier, a simple tool, for example a lever tool or pliers can be used. Alternatively, the clip element $200_k$, $200_m$ can comprise lever sections or receiving sections such as receiving openings for receiving a tool, for example on the limb sections $210_{k1}$, $210_{m1}$, $210_{k2}$, $210_{m2}$.

Figure 2:
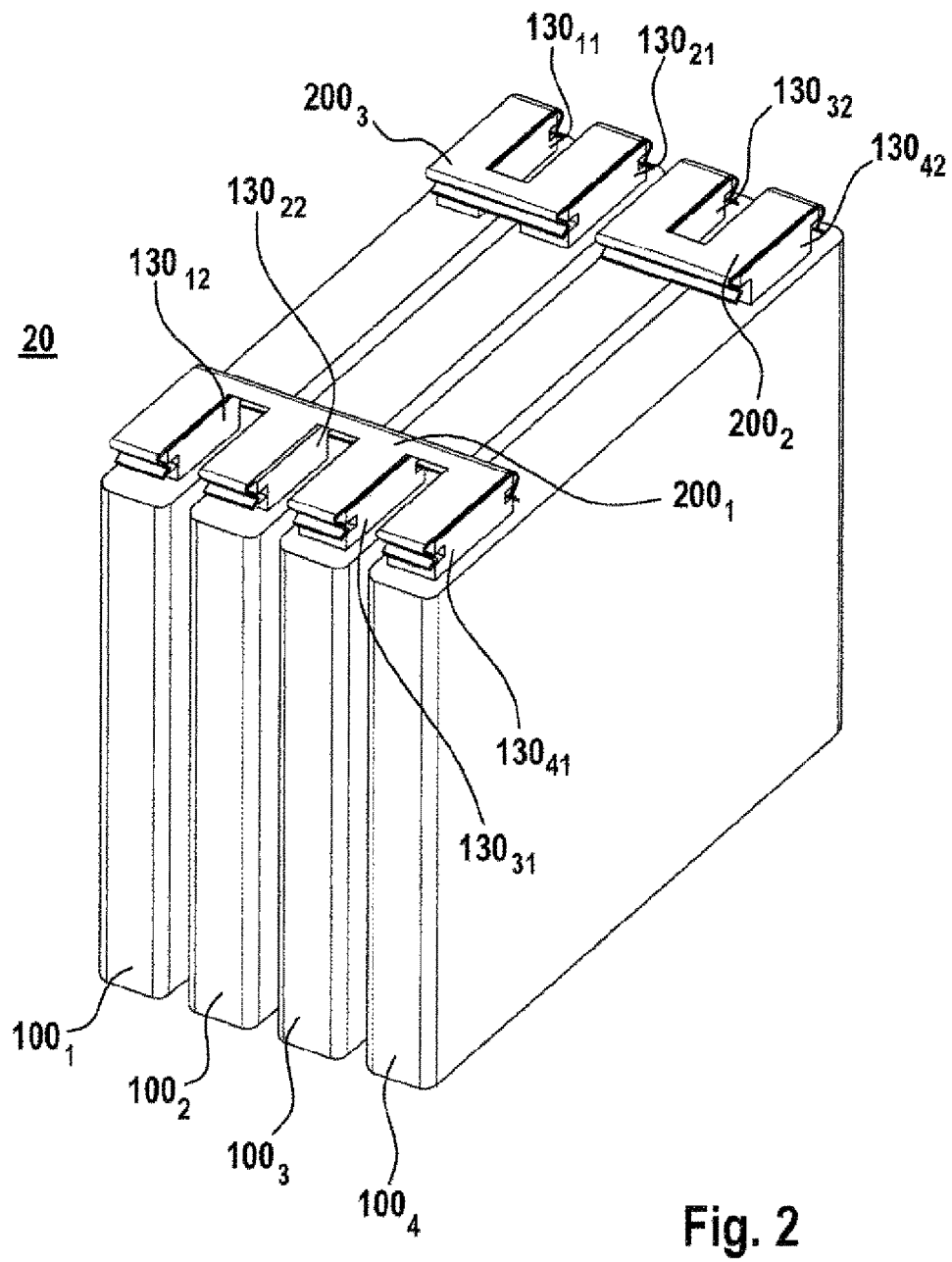
FIG. 2 shows a schematic perspective view of an exemplary battery module 20 comprising the clip elements $200_1, \ldots 200_3$ in accordance with this embodiment of the invention.

FIG. 2 shows a schematic perspective view of an exemplary battery module 20 comprising the clip elements $200_1$, ... $200_3$ in accordance with this embodiment of the invention.

With reference to FIG. 1, the exemplary battery module 20, as shown in FIG. 2, comprises a multiplicity of battery cells $100_1$, ... $100_4$ and a multiplicity of clip elements $200_1$, ... $200_3$.

The back sections and the first limb sections $210_{k1}$, $210_{m1}$ or the second limb sections $210_{k2}$, $210_{m2}$ of the clip elements $200_k$, ... $200_3$ are divided into a multiplicity of regions, wherein the clip elements $200_1$, ... $200_3$ surround the cell terminals $130_{11}$, ... $130_{42}$ in each case in these regions.

In this case, the clip elements $200_1$, $200_3$ bring about a parallel connection of the battery cells $100_1$, $100_2$. Furthermore, the clip elements $200_1$, $200_2$ bring about a parallel connection of the battery cells $100_3$, $100_4$. In addition, the clip element $200_1$ brings about a series connection of the parallel-connected battery cells $100_1$, $100_2$ and the parallel-connected battery cells $100_3$, $100_4$.

FIGS. 3 to 6 show, in order to illustrate the fitting, schematic side views of another battery module 10' comprising another clip element $200'_k$ in accordance with another embodiment of the invention.

With reference to FIG. 1, the other battery module 10' comprises another clip element $200'_k$. In contrast to the clip element shown in FIG. 1, the engagement sections $220'_{k1}$, $220'_{k2}$ are designed to be asymmetrical and are formed in such a way that they can reach into the receiving sections $135_{n11}$, $135_{n21}$, $135_{n12}$, $135_{n22}$ of the cell terminals $130_{n1}$, $130_{n2}$. Furthermore, the back section is designed to be longer such that the two engagement sections $220'_{k1}$, $220'_{k2}$ can be brought into engagement by displacement of the clip element $200'_k$. In addition, the back section is concavely bent so that a spacing between the back section and the engagement sections $220'_{k1}$, $220'_{k2}$ is reduced.

Figure 3:
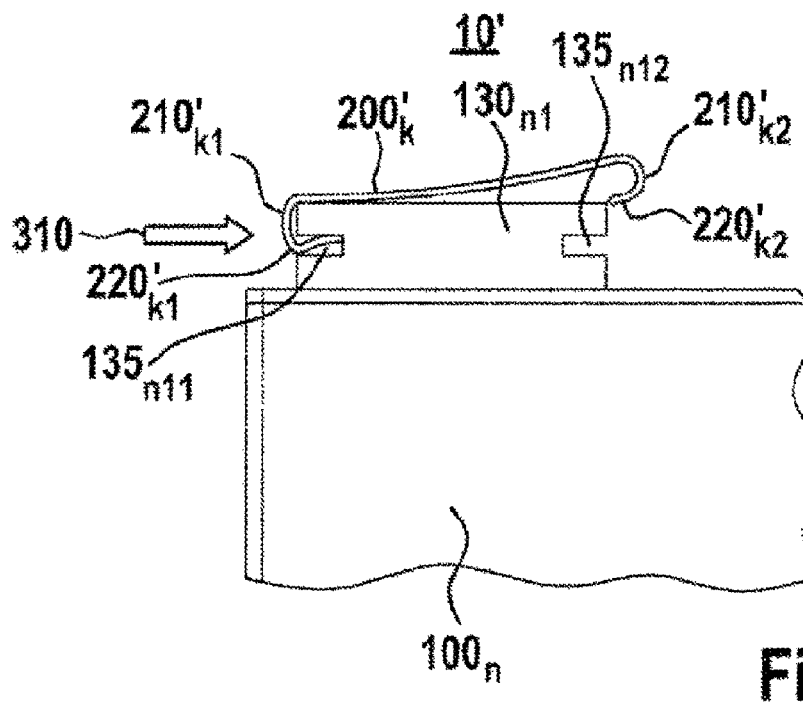
FIGS. 3 to 6 show, in order to illustrate the fitting, schematic side views of another battery module 10' comprising another clip element $200_k$ in accordance with another embodiment of the invention.
Figure 4:
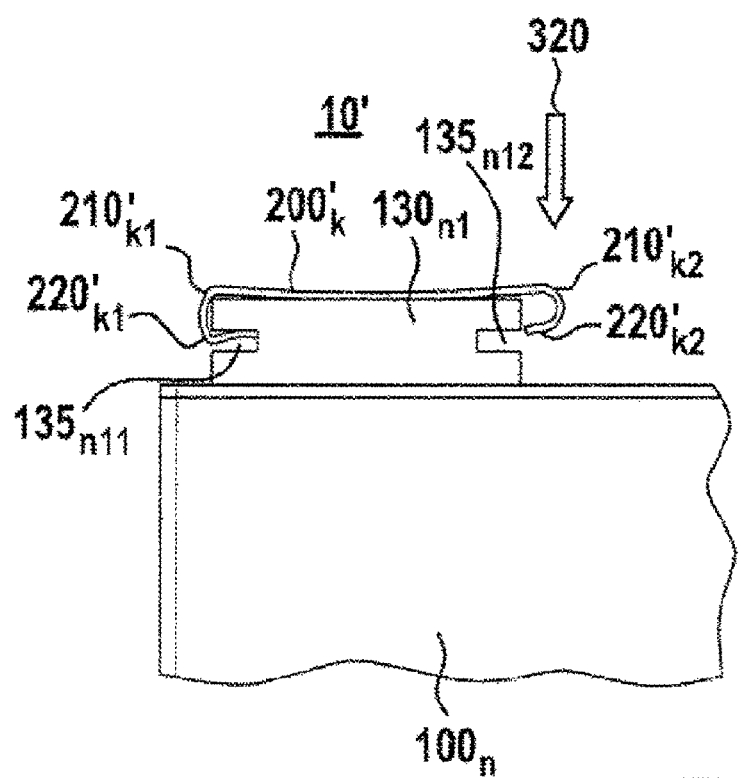
Figure 5:
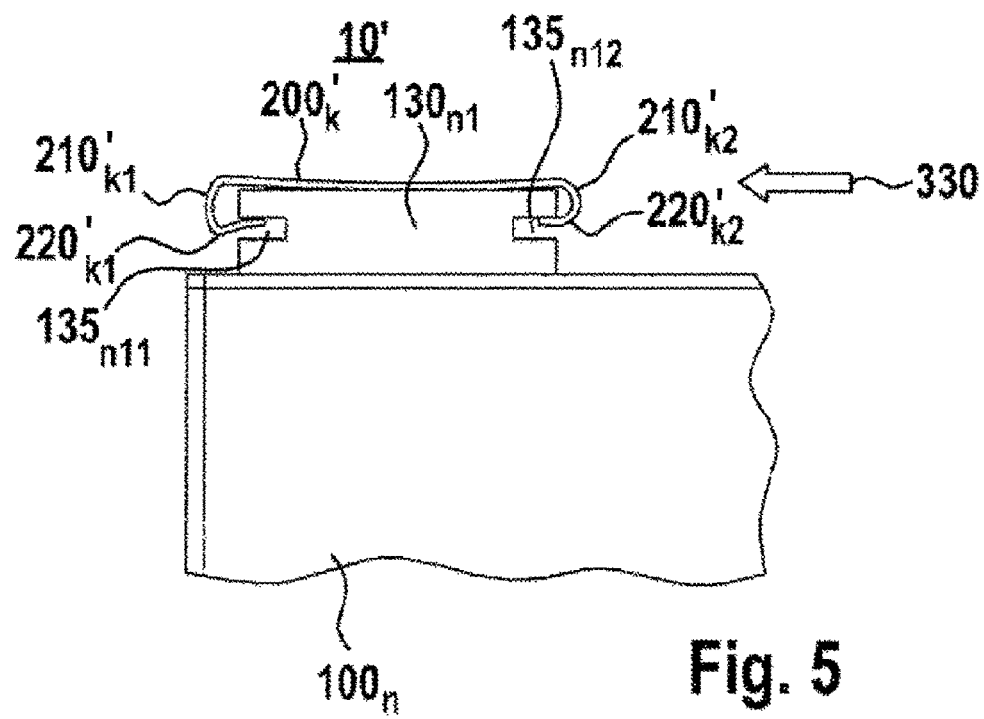
Figure 6:
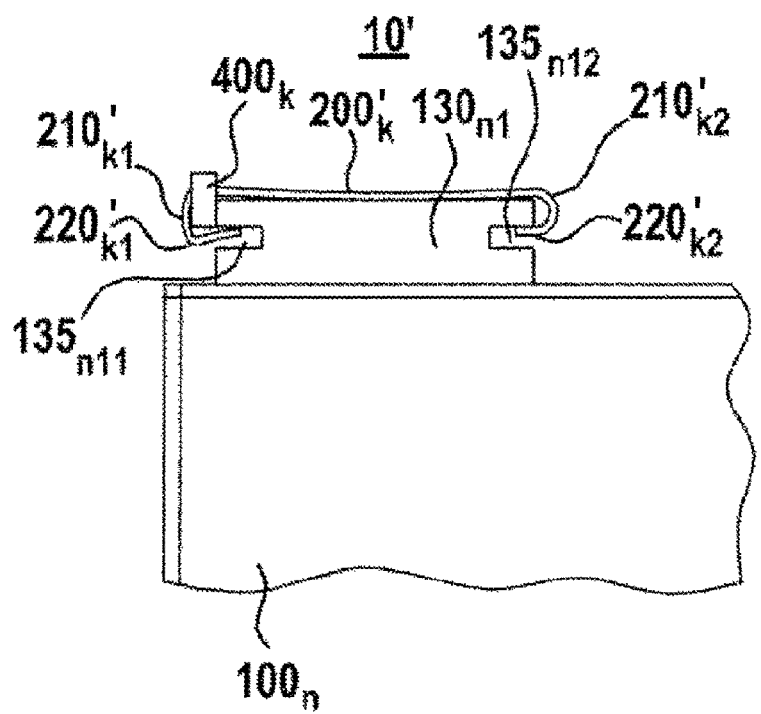

The fitting of the clip element $200_k$ comprises suspending the first engagement section $220'_{k1}$ by pushing the clip element $200'_k$, in a direction 310, as shown in FIG. 3, tensioning the clip element $200'_k$ by pressing down the second limb section $210'_{k2}$ in a direction 320, as shown in FIG. 4, and suspending the second engagement section $210'_{k2}$ by displacing the clip element $200'_k$ in a direction 330 which is opposite the direction 310, as shown in FIG. 5. The fitting can furthermore comprise connecting a securing element $400_k$ to the clip element $200'_k$ for locking the clip element $200'_k$, as shown in FIG. 6.

The dismantling is performed in reverse order.

Figure 7:
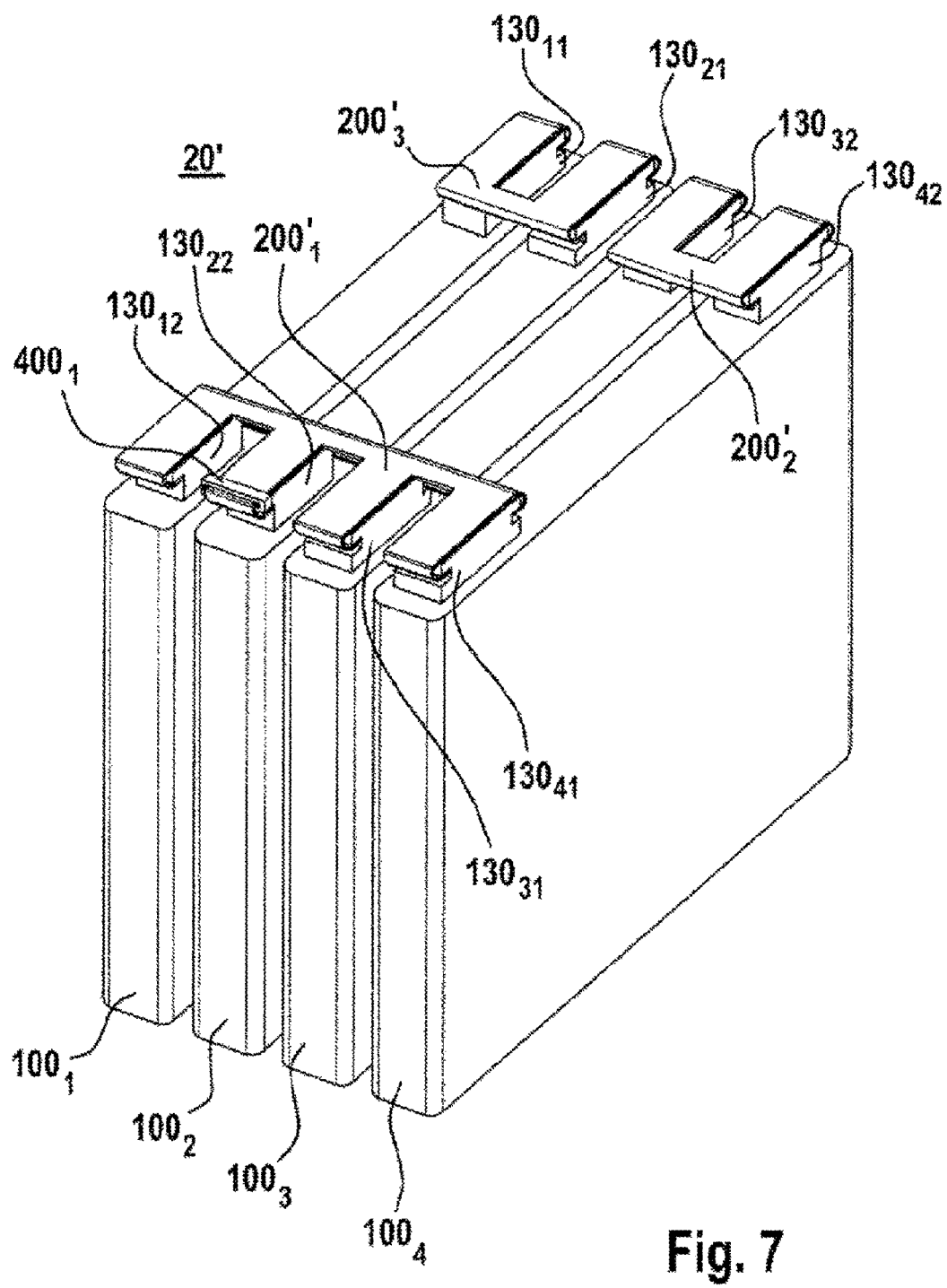
FIG. 7 shows a schematic perspective view of an exemplary battery module 20 comprising the other clip elements $200_1, \ldots 200_3$ in accordance with this other embodiment of the invention.

FIG. 7 shows a schematic perspective view of an exemplary battery module 20' comprising the other clip elements $200'_1$, ... $200'_3$ in accordance with the other embodiment of the invention.

With reference to FIG. 7, the exemplary battery module 20', as shown in FIG. 7, comprises a multiplicity of battery cells $100_1$, ... $100_4$, a multiplicity of clip elements $200'_1$, ... $200'_3$ and a securing element $400_1$, which correspond to the clip element $200'_k$ or securing element 400 described with reference to FIGS. 3 to 6.

Figure 8:
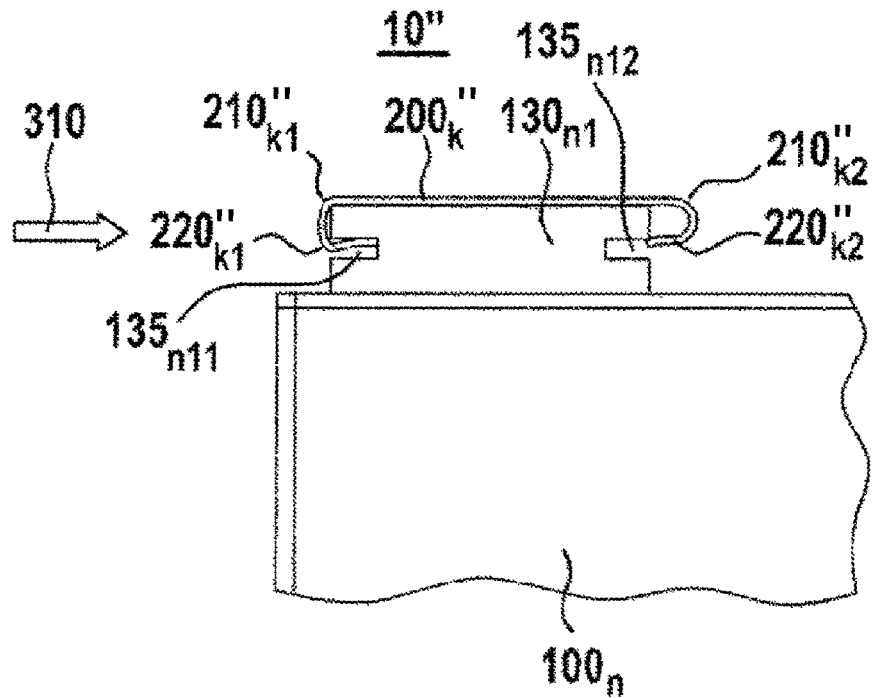
FIGS. 8 to 10 show, in order to illustrate the fitting, schematic side views of a further battery module 10″ comprising a further clip element $200_k$ in accordance with a further embodiment of the invention.
Figure 9:
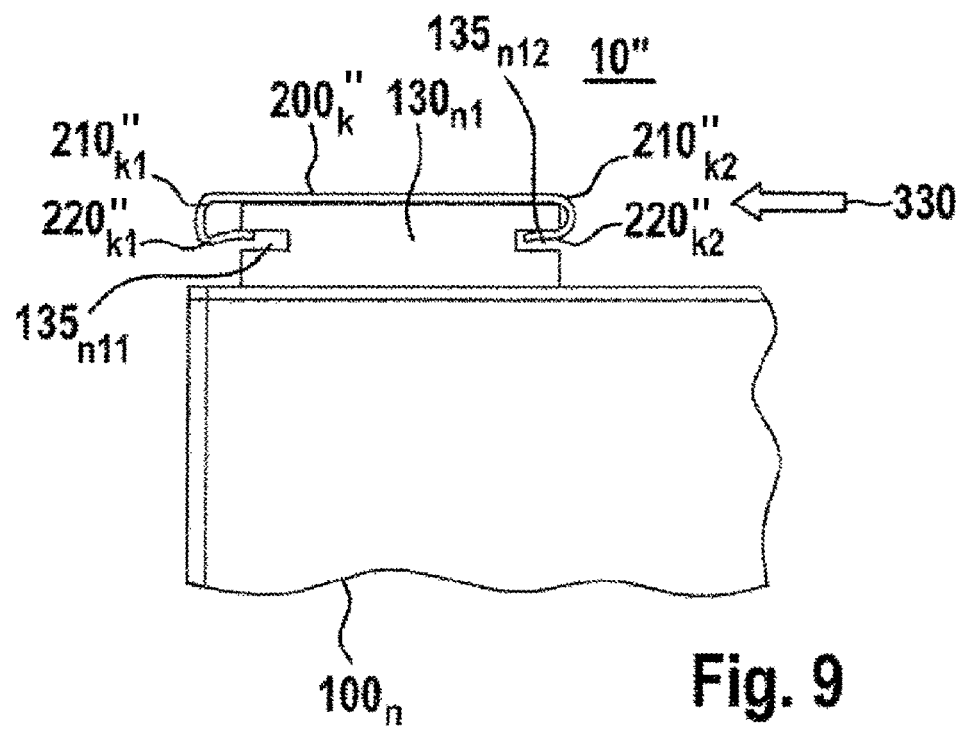
Figure 10:
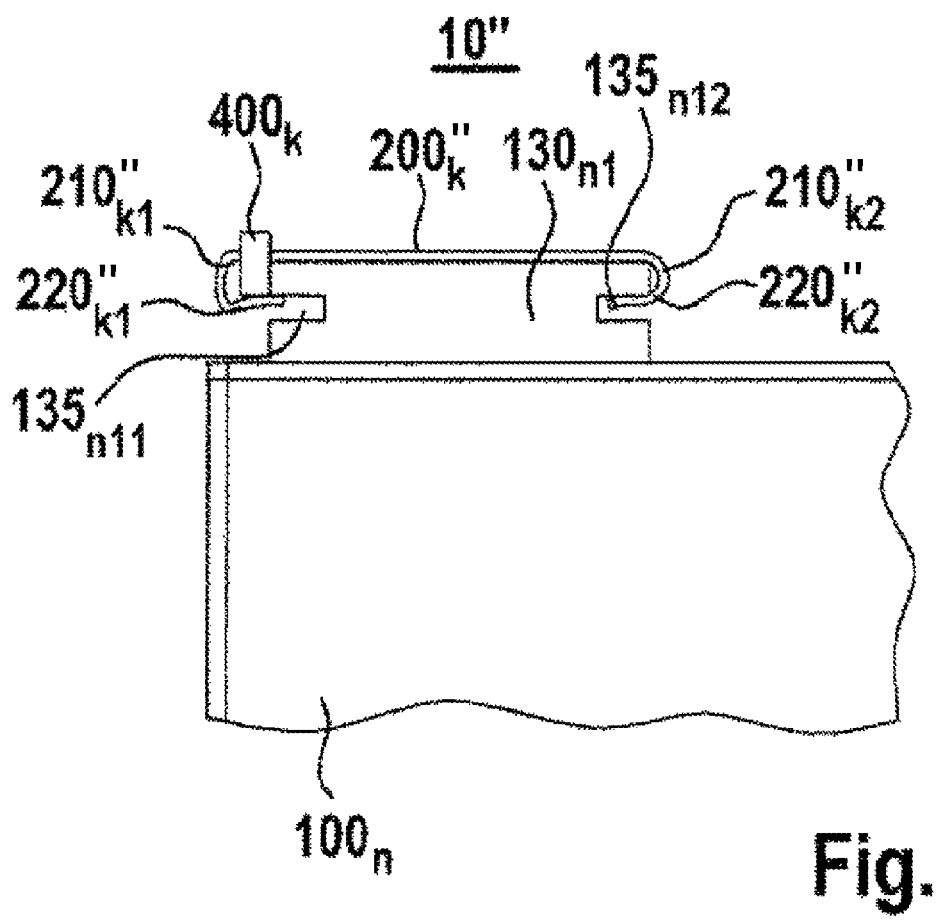

FIGS. 8 to 10 show, in order to illustrate fitting, schematic side views of a further battery module 10" comprising a further clip element $200''_k$ in accordance with a further embodiment of the invention.

With reference to FIGS. 10, the further battery module 10" comprises another clip element $200''_k$. In contrast to the clip element shown in FIGS. 3 to 6, the second engagement section $220''_{k2}$ is designed in a sprung manner and comprises a sloping, tensionable bulge. Therefore, the back section, as in the case of the clip elements $200_k$, $200_m$ already described with reference to FIG. 1, can be designed to be flat.

The fitting of the clip element $200''_k$ comprises suspending the first engagement section $220''_{k1}$ by pushing the clip element $200''_k$ in a direction 310, as shown in FIG. 8, and tensioning the second engagement section $220''_{k2}$ at the cell terminal $130_{n1}$ by displacing the clip element $200''_k$ in a direction 330 which is opposite the direction 310, as shown in FIG. 9. The fitting can furthermore comprise connecting a securing element $400_k$ to the clip element $200''_k$ in order to lock the clip element $200''_k$, as shown in FIG. 10.

The dismantling is performed in reverse order.

Figure 11:
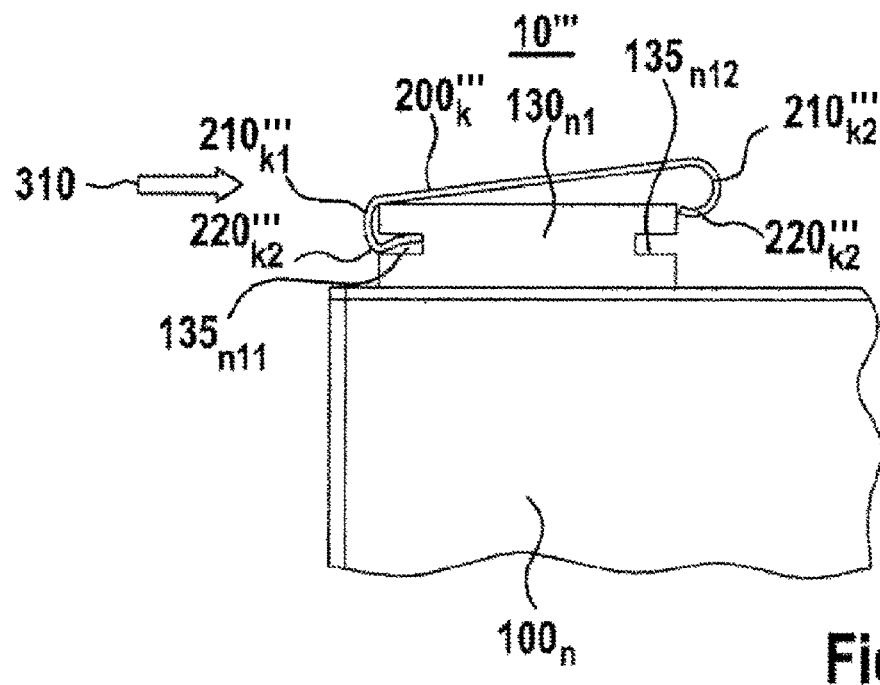
FIGS. 11 and 12 show, in order to illustrate the fitting, schematic side views of yet another battery module 10‴ comprising another clip element $200_k$ in accordance with yet another embodiment of the invention.
Figure 12:
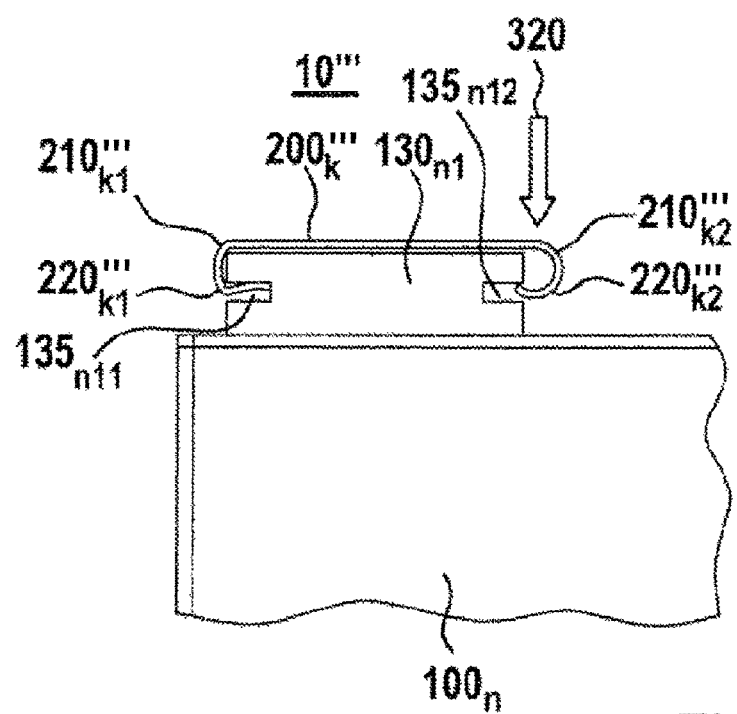

FIGS. 11 and 12 show, in order to illustrate the fitting, schematic side views of another battery module 10''' comprising another clip element $200'''_k$ in accordance with another embodiment of the invention.

With reference to FIGS. 11-12, the other battery module 10''' comprises another clip element $200'''_k$. In contrast to the clip element shown in FIGS. 11-12, the second engagement section $220'''_{k2}$ is designed to be sprung in such a way that the second engagement section $220'''_{k2}$ can expand the cell terminal $130_{n1}$ when the clip element $200'''_k$ is pressed down. Thus, the back section, as in the case of the clip elements $200_k$, $200_m$ already described with reference to FIG. 1, can be designed to be unextended.

The fitting of the clip element $200'''_k$ comprises suspending the first engagement section $220'''_{k1}$ by pushing the clip element $200'''_k$ in a direction 310, as shown in FIG. 11, and tensioning the second engagement section $220'''_{k2}$ at the cell terminal $130_{n1}$ by pressing down the second limb section $210'''_{k2}$ in a direction 320, as shown in FIG. 12. Therefore, this fitting method does not require either displacement in an opposite direction nor attachment of a securing element.

The dismantling is performed in reverse order.

Figure 13:
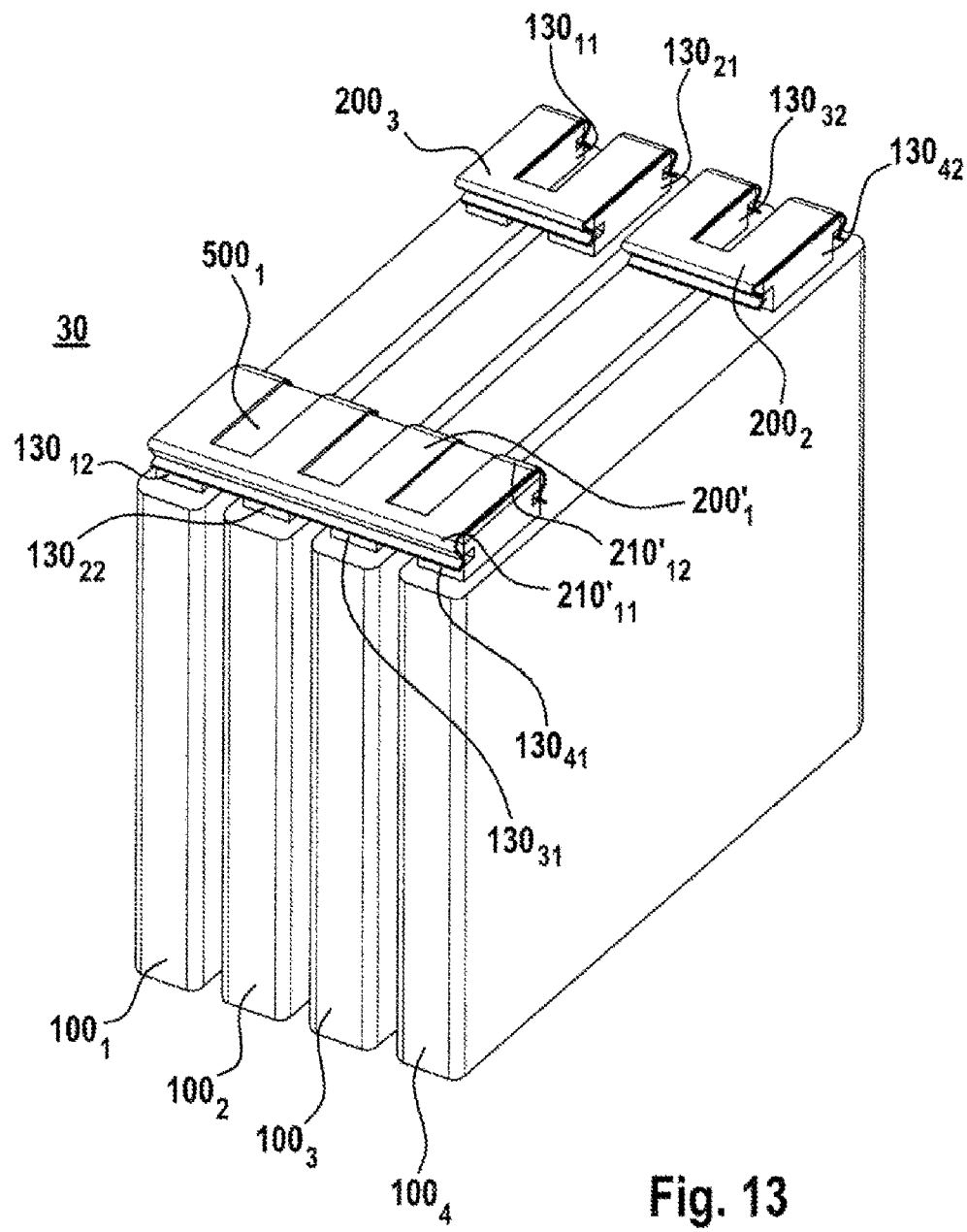
FIG. 13 shows a schematic perspective view of an exemplary modified battery module 30 comprising a modified clip element $200'_1$ and a current conduction element $500_1$ in accordance with a modified embodiment of the invention.

FIG. 13 shows a schematic perspective view of an exemplary modified battery module 30 comprising a modified clip element $200'_1$ and a current conduction element $500_1$ in accordance with a modified embodiment of the invention.

In contrast to the battery modules 20 and 20' described with reference to FIGS. 2 and 7, respectively, the exemplary modified battery module 30, as shown in FIG. 7, comprises a modified clip element $200'_1$ and a current conduction element (busbar) $500_1$. In this case, the first limb section $210'_{11}$ and the second limb section $210'_{12}$ of the clip element $200'_1$ are extended in such a way that the current conduction element $500_1$ can be arranged between the clip element $200'_1$ and the cell terminals $130_{12}$, $130_{22}$, $130_{31}$, $130_{41}$.

Figure 14:
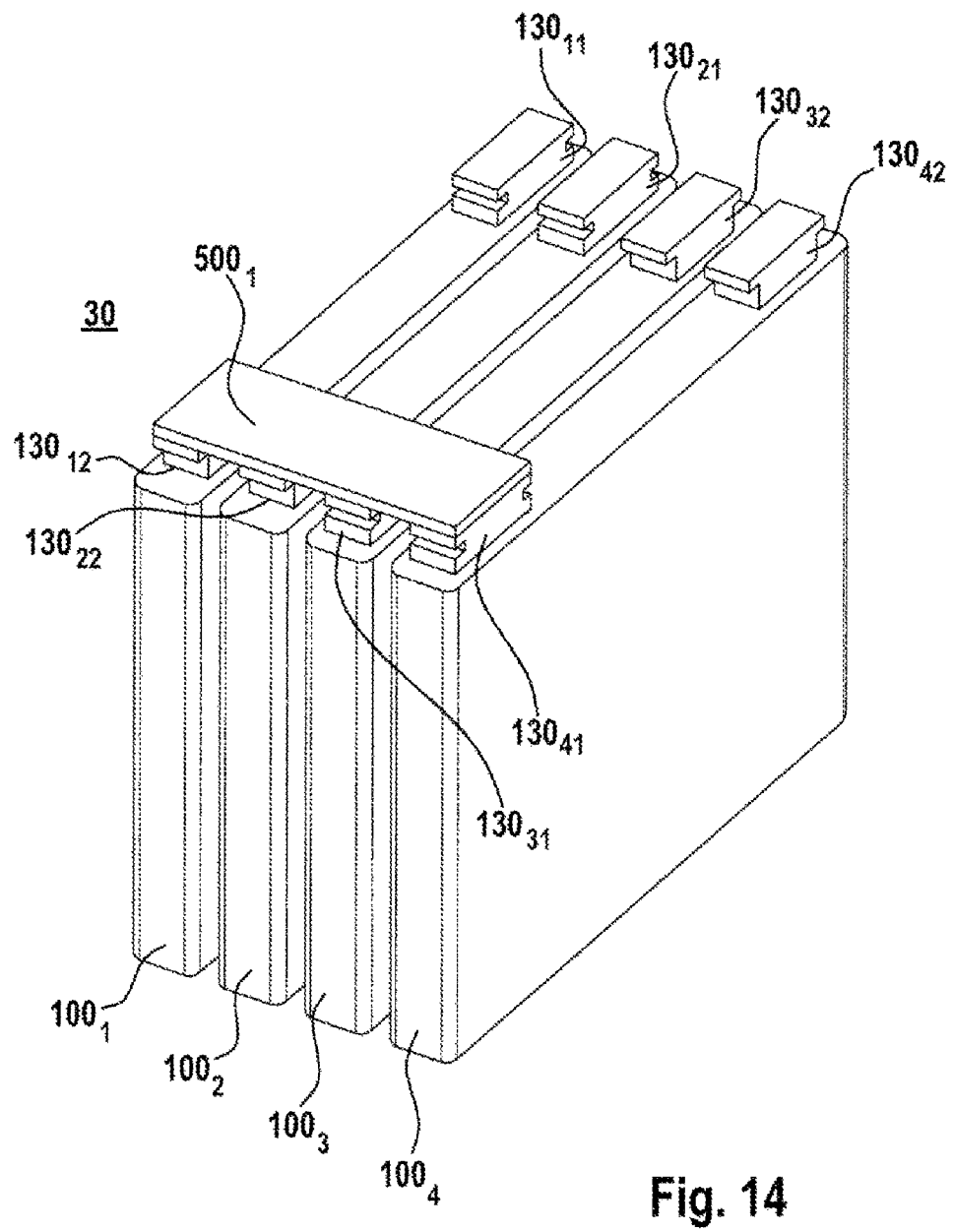
FIG. 14 shows, in order to illustrate the current conduction element $500_1$, a schematic perspective view of the exemplary modified battery module 30 in accordance with the modified embodiment of the invention without the modified clip element $200'_1$.

FIG. 14 shows, in order to illustrate the current conduction element 501, a schematic perspective view of the exemplary embodiment battery module 30 in accordance with the modified embodiment of the invention without the modified clip element $200'_1$.

In contrast to FIG. 13, FIG. 14 shows the exemplary modified battery module 30 without the modified clip element $200'_1$.

Figure 15:
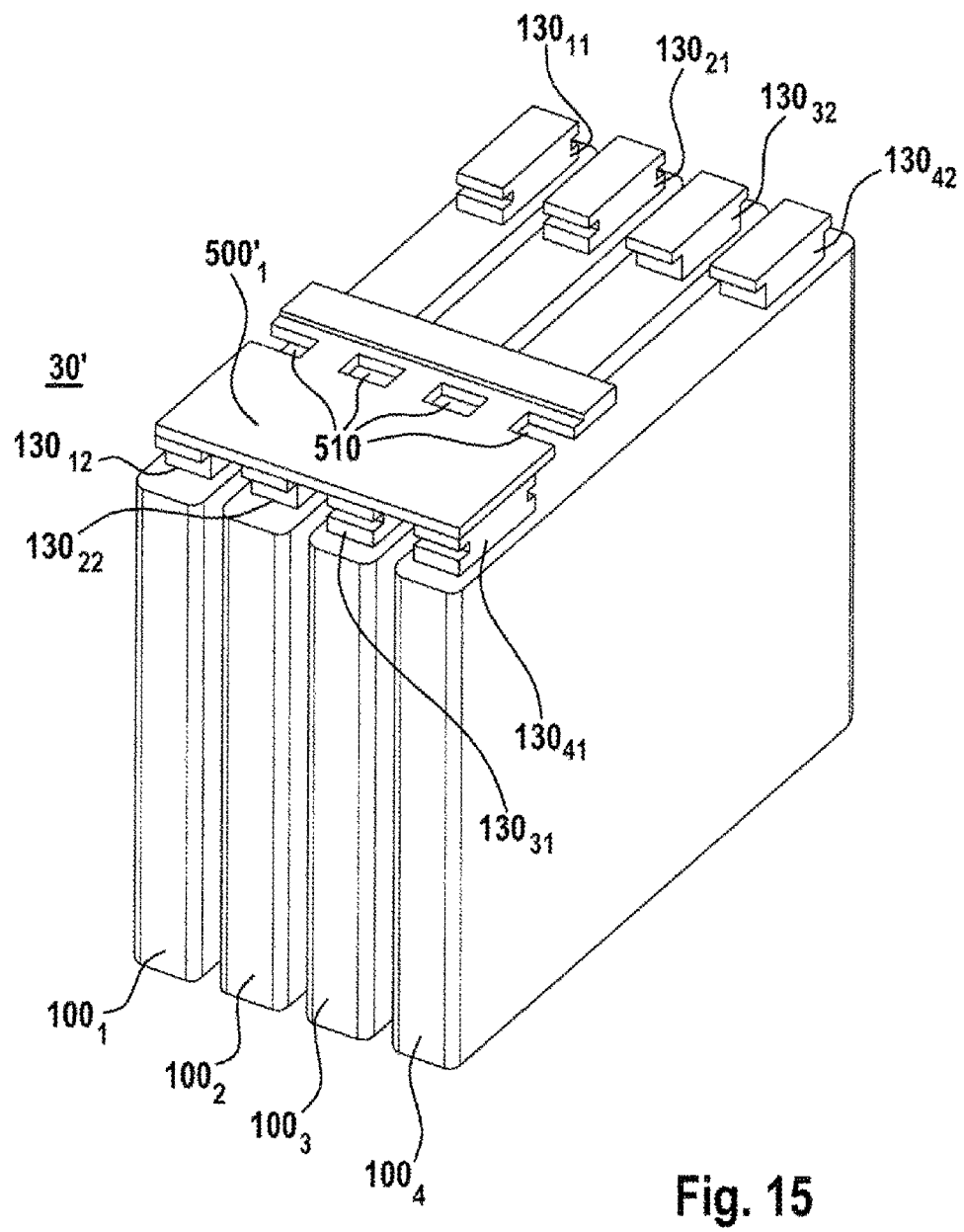
FIG. 15 shows, in order to illustrate a modified current conduction element $500'_1$, a schematic perspective view of an exemplary other modified battery module 30' in accordance with another modified embodiment of the invention without the modified clip element $200'_1$.

FIG. 15 shows, in order to illustrate a modified current conduction element $500'_1$, a schematic perspective view of an exemplary other modified battery module 30' in accordance with another modified embodiment of the invention without the modified clip element $200'_1$.

In contrast to FIG. 14, FIG. 15 shows the exemplary other modified battery module 30' comprising the modified current conduction element $500'_1$. In contrast to the current conduction element $500_1$, the modified current conduction element $500'_1$ is enlarged and comprises a multiplicity of openings 510 for passing through the second limb section $210'_{12}$.

Finally, mention will be made of the fact that expressions such as "comprising" and "having" or the like do not exclude the possibility of further elements or steps being provided. Furthermore, it will be mentioned that "one" or "a" or "an" do not exclude the possibility of a multiplicity. In addition, the features described in connection with the various embodiments can be combined with one another as desired. Finally, it will be mentioned that the reference symbols in the claims should not be interpreted as being restrictive to the scope of protection of the claims.

What is claimed is:

1. A cell connector for an electrical or mechanical connection of cell terminals ($130_{n1}$, $130_{n2}$) of battery cells ($100_n$), comprising
   a clip element ($200_k$, $200_m$) for fastening the cell connector to one of the cell terminals ($130_{n1}$, $130_{n2}$), the clip element including a back section, a first limb section ($210_{k1}$, $210_{m1}$) which is formed at a first end of the back section, having a first engagement section ($220_{k1}$, $220_{m1}$), and a second limb section ($210_{k2}$, $210_{m2}$), which is formed at a second end of the back section and is formed so as to be spaced apart from and opposite the first limb section ($210_{k1}$, $210_{m1}$), having a second engagement section ($220_{k2}$, $220_{m2}$), wherein the first limb section ($210_{k1}$, $210_{m1}$) and the second limb section ($210_{k2}$, $210_{m2}$) are asymmetrical,
   wherein the clip element ($200_k$, $200_m$) is configured to at least partially surround the cell terminal ($130_{n1}$, $130_{n2}$),
   wherein the first engagement section ($220_{k1}$, $220_{m1}$) and the second engagement section ($220_{k2}$, $220_{m2}$) are configured such that the cell terminal ($130_{n1}$, $130_{n2}$) is clamped between the first engagement section ($220_{k1}$, $220_{m1}$) and the second engagement section ($220_{k2}$, $220_{m2}$),
   wherein the back section is configured to be longer than the cell terminal ($130_{n1}$, $130_{n2}$) such that the first engagement section ($220_{k1}$, $220_{m1}$) and the second engagement section ($220_{k2}$, $220_{m2}$) are configured to be brought into engagement with the cell terminal ($130_{n1}$, $130_{n2}$) by displacement of the clip element ($200_k$, $200_m$),
   wherein the first limb section ($210_{k1}$, $210_{m1}$) includes a first portion and a second portion, wherein the first portion is continuous with the back section and extends generally perpendicular to the back section, and wherein the second portion is continuous with the first portion and extends toward the second limb section and toward the back section at an end of the second portion such that the first limb section and the back section are U-shaped, and
   wherein the second limb section ($210_{k2}$, $210_{m2}$) includes a third portion and a fourth portion, wherein the third portion is continuous with the back section and extends generally perpendicular to the back section, and wherein the fourth portion is continuous with the third portion and extends toward the first limb section and is generally parallel with the back section at an end of the fourth portion such that the second limb section and the back section are U-shaped.

2. The cell connector according to claim 1, wherein the clip element ($200_k$, $200_m$) is configured to be at least sectionally sprung.

3. The cell connector according to claim 1, wherein the clip element ($200_k$, $200_m$) is configured to be electrically conductive or nonconductive.

4. The cell connector according to claim 1, wherein the first engagement section ($220_{k1}$, $220_{m1}$) and the second engagement section ($220_{k2}$, $220_{m2}$) are configured to be asymmetrical with respect to one another.

5. The cell connector according to claim 1, wherein the clip element ($200_k$, $200_m$), the back section, the first limb section ($210_{k1}$, $210_{m1}$) or the second limb section ($210_{k2}$, $210_{m2}$) is configured such that the first engagement section ($220_{k1}$, $220_{m1}$), the second engagement section ($220_{k2}$, $220_{m2}$) or first engagement section ($220_{k1}$, $220_{m1}$) and the second engagement section ($220_{k2}$, $220_{m2}$) are configured to each engage in the cell terminal ($130_{n1}$, $130_{n2}$).

6. The cell connector according to claim 1, wherein the clip element ($200_k$, $200_m$) is configured such that the back section, the first limb section ($210_{k1}$, $210_{m1}$) or the second limb section ($210_{k2}$, $210_{m2}$) is divided into a multiplicity of regions, wherein the clip element ($200_k$, $200_m$) is configured to at least partially surround the cell terminal ($130_{n1}$, $130_{n2}$) in each case in the regions.

7. The cell connector according to claim 1, wherein the clip element ($200_k$, $200_m$) is configured so as to be severable or cuttable so that the clip element ($200_k$, $200_m$) is configured to be cut to length depending on a number of or a spacing between the cell terminals ($130_{n1}$, $130_{n2}$) of adjacent ones of the battery cells.

8. The cell connector according to claim 1, further comprising an electrical conductor (500) or a busbar for electrical connection of cell terminal ($130_{n1}$, $130_{n2}$), wherein the clip element ($200_k$, $200_m$), the back section, the first limb section ($210_{k1}$, $210_{m1}$) or the second limb section ($210_{k2}$, $210_{m2}$) is configured such that the electrical conductor (500) or the busbar is configured to be arranged between the clip element ($200_k$, $200_m$) and the cell terminal ($130_{n1}$, $130_{n2}$).

9. The cell connector according to claim 1, further comprising an electrical conductor (500) or a busbar for electrical connection of cell terminal ($130_{n1}$, $130_{n2}$), wherein the electrical conductor (500) or the busbar include openings (510) for passing through the first limb section ($210_{k1}$, $210_{m1}$) or the second limb section ($210_{k2}$, $210_{m2}$).

10. The cell connector according to claim 1, further comprising an electrical conductor (500) or a busbar for electrical connection of cell terminal ($130_{n1}$, $130_{n2}$), wherein a securing element (400), which is connectable to the clip element ($200_k$, $200_m$) in a region of the first limb section ($210_{k1}$, $210_{m1}$) or second limb section ($210_{k2}$, $210_{m2}$), for securing the fastening of the cell connector.

11. A battery module (10; 20; 30), comprising:
the cell connector according to claim 1, and
a cell terminal to which the clip element is attached.

12. A vehicle, comprising the battery module (10; 20; 30) according to claim 11 connected to the vehicle.

13. A vehicle, comprising the cell connector according to claim 1 connected to the vehicle.

14. The cell connector according to claim 1, wherein the back section is concavely bent.

15. The cell connector according to claim 1, wherein the clip element is a first clip element, and the cell connector further includes a second clip element.

16. A method for producing a battery module (10; 20; 30), comprising
providing a cell connector according to claim 1,
providing battery cells (100) each having the one of the cell terminals ($130_{n1}$, $130_{n2}$), wherein the cell terminals ($130_{n1}$, $130_{n2}$) each comprise a first receiving section ($135_{n11}$, $135_{n21}$) for receiving the first engagement section ($220_{k1}$, $220_{m1}$) and a second receiving section ($135_{n12}$, $135_{n22}$), which is spaced apart from and opposite the first receiving section ($135_{n11}$, $135_{n21}$), for receiving the second engagement section ($220_{k2}$, $220_{m2}$), wherein the cell terminal ($130_{n1}$, $130_{n2}$) is shorter than the back section,
positioning the first engagement section ($220_{k1}$, $220_{m1}$) in the first receiving section ($135_{n11}$, $135_{n21}$) by pushing the clip element ($200_k$, $200_m$) in a first direction (310) such that the first engagement section ($220_{k1}$, $220_{m1}$) is positioned in the first receiving section ($135_{n11}$, $135_{n21}$),
pressing down, after positioning the first engagement section ($220_{k1}$, $220_{m1}$) in the first receiving section ($135_{n11}$, $135_{n21}$), the second limb section ($210_{k2}$, $210_{m2}$) in a second direction (320), which is perpendicular to the first direction (310), such that the clip element ($200_k$, $200_m$) is tensioned and the second limb section ($210_{k2}$, $210_{m2}$) is aligned with the second receiving section ($135_{n12}$, $135_{n22}$),
positioning, after pressing down the second limb section ($210_{k2}$, $210_{m2}$) in the second direction (320), the second engagement section ($220_{k2}$, $220_{m2}$) in the second receiving section ($135_{n12}$, $135_{n22}$) by displacing the clip element ($200_k$, $200_m$) in a third direction (330), which is opposite to the first direction (310), such that the cell terminal ($130_{n1}$, $130_{n2}$) is clamped between the first engagement section ($220_{k1}$, $220_{m1}$) and the second engagement section ($220_{k2}$, $220_{m2}$) and the clip element ($200_k$, $200_m$) at least partially surrounds the cell terminal ($130_{n1}$, $130_{n2}$).

17. The method according to claim 16, further comprising:
providing a securing element (400), and
connecting the securing element (400) to the clip element ($200_k$, $200_m$) once the second engagement section ($220_{k2}$, $220_{m2}$) has been suspended.

18. The method according to claim 16, further comprising:
providing an electrical conductor (500) or a busbar, and
arranging the electrical conductor (500) or the busbar on the cell terminal ($130_{n1}$, $130_{n2}$).

19. The method according to claim 16, wherein the first limb section ($210_{k1}$, $210_{m1}$) and the second limb section ($210_{k2}$, $210_{m2}$) are asymmetrical.

20. The method according to claim 19, wherein the back section is concavely bent.

* * * * *